United States Patent
Shibata

(10) Patent No.: US 11,846,415 B2
(45) Date of Patent: Dec. 19, 2023

(54) LIGHTING DEVICE

(71) Applicant: Japan Display Inc., Tokyo (JP)

(72) Inventor: Michihide Shibata, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/864,500

(22) Filed: Jul. 14, 2022

(65) Prior Publication Data

US 2023/0027041 A1  Jan. 26, 2023

(30) Foreign Application Priority Data

Jul. 21, 2021 (JP) .................................. 2021-120151

(51) Int. Cl.
*F21V 7/00* (2006.01)
*F21V 7/04* (2006.01)
*F21Y 115/10* (2016.01)

(52) U.S. Cl.
CPC .............. *F21V 7/005* (2013.01); *F21V 7/041* (2013.01); *F21Y 2115/10* (2016.08)

(58) Field of Classification Search
CPC ....... F21V 7/005; F21V 7/041; F21Y 2115/10
See application file for complete search history.

(56) References Cited

U.S. PATENT DOCUMENTS

| | | | |
|---|---|---|---|
| 6,527,411 B1* | 3/2003 | Sayers | F21S 41/24 362/555 |
| 8,083,375 B2* | 12/2011 | Kong | G02B 6/0078 362/555 |
| 2005/0281048 A1* | 12/2005 | Coushaine | F21S 43/251 362/555 |
| 2010/0157252 A1* | 6/2010 | Itoh | G03B 21/2073 362/241 |
| 2011/0205737 A1* | 8/2011 | Kong | G03B 21/2033 362/244 |

FOREIGN PATENT DOCUMENTS

JP   2012-216417 A   11/2012

* cited by examiner

*Primary Examiner* — Evan P Dzierzynski
(74) *Attorney, Agent, or Firm* — Michael Best & Friedrich LLP

(57) ABSTRACT

The purpose is to realize a lighting device of thin, small light distribution angle and high intensity illumination. The invention is: a lighting device, which emits light in a direction perpendicular to a normal surface, including: light source units, disposed radially with a certain azimuth with respect to a center of the lighting device, each of the light source units, having an optical axis parallel to the major surface, and emitting light toward the center of the lighting device, each of the light source units including a funnel shaped reflector, which has an opening and a neck, and an LED light source disposed at the neck, mirrors disposed opposing to the openings of the light source units, in which the mirrors reflect light emitted from the light source units to the direction perpendicular to the major surface.

9 Claims, 9 Drawing Sheets

LIGHTING DEVICE

CLAIM OF PRIORITY

The present application claims priority from Japanese Patent Application JP 2021-120151 filed on Jul. 21, 2021, the content of which is hereby incorporated by reference into this application.

BACKGROUND OF THE INVENTION

(1) Field of the Invention

The present invention relates to a lighting device especially to a lighting device of small light distribution angle, and to a lighting device in which white color temperature can be changed easily.

(2) Description of the Related Art

Usage of LED (LED, Light Emitting Diode) has been expanding. Since LED has a high light emission efficiency, it is profitable for a low power consumption. LED, however, needs various optical devices to collimate the light from the LED to acquire light having necessary light distribution angle, and to acquire a small light spot size.

Patent document 1 discloses a structure of lighting device having a circular projection light distribution pattern, in which an intensity of light is high at a center, and becomes gradually weaker in going to periphery. More concretely, Patent document 1 discloses a plurality of condensers, which include LEDs, reflecting components, lenses and so forth, are aligned in a plane; reflecting the light from the plurality of condensers by polygonal pyramid; emitting the light through the integrator, the hyperboloid reflecting mirror and the parabola reflecting mirror.

PRIOR TECHNICAL DOCUMENT

Patent Document

Patent document 1: Japanese patent application laid open No. 2012-216417

SUMMARY OF THE INVENTION

It is effective to use a parabolic mirror to acquire collimated light, however, a length in a light axis of the parabolic mirror becomes large to acquire enough collimated light. Consequently, a height of lighting device becomes large, as a result, it becomes difficult to dispose the lighting device in a place where a thin lighting device is necessary.

The structure of patent document 1, in which a plurality of light sources are located in a plane, needs a hyperboloid mirror and a parabolic mirror, therefore, it is difficult to attain a thin lighting device.

The purpose of the present invention is to realize a thin lighting device which gives light of enough intensity, and thoroughly collimated.

The present invention solves the above explained problems; examples of concrete structures of the present invention are as follows.

(1) A lighting device which emits light in a direction perpendicular to a normal surface including: a plurality of light source units, disposed radially with a certain azimuth with respect to a center of the lighting device; each of the plurality of the light source units, having an optical axis parallel to the major surface, and emitting light toward the center of the lighting device; each of the plurality of the light source units including a funnel shaped reflector, which has an opening and a neck, and an LED light source disposed at the neck; a plurality of mirrors being disposed opposing to the plurality of openings of the light source units, in which the mirrors reflect light emitted from the plurality of the light source units to the direction perpendicular to the major surface.

(2) The lighting device according to (1), in which an inner wall of the funnel shaped reflector is mirror surface, and at least a part of a cross section of the inner wall along the light axis is parabolic.

(3) The lighting device according to (1), in which a cross section of the opening of the funnel shaped reflector in a direction perpendicular to the light axis is rectangular.

(4) A lighting device including a light guide, which emits light in a direction perpendicular to a major surface, in which a plurality of light source units, each of which has an optical axis in a direction parallel to the major surface, are disposed radially with a certain azimuth with respect to a center of the light guide at an outside of the light guide; each of the plurality of the light source units includes a funnel shaped reflector, which has an opening and a neck, and an LED light source disposed at the neck; a plurality of mirrors are disposed opposing to the plurality of openings of the light source units in an inside of the light guide; and the mirrors reflect light emitted from the plurality of the light source units to the direction perpendicular to the major surface.

(5) The lighting device according to (4), in which the light guide is ring shaped, and the plurality of mirrors are disposed at an inner wall of the light guide.

(6) A lighting device including a first light guide having a first major surface, and a second light guide having a second major surface, in which the first light guide and the second light guide are superposed one on top of another; the first light guide emits light in a first direction, which is perpendicular to the first major surface; the second light guide emits light in the first direction, which is perpendicular to the second major surface; a plurality of first light source units, each of which has an optical axis in a direction parallel to the first major surface, are disposed at an outside of the first light guide and disposed radially with a certain azimuth with respect to a center of the first light guide; a plurality of second light source units, each of which has an optical axis in a direction parallel to the second major surface, are disposed at an outside of the second light guide and disposed radially with the certain azimuth with respect to a center of the second light guide; each of the plurality of the first light source units and the second plurality of the light source units includes a funnel shaped reflector, which has an opening and a neck, and an LED light source disposed at the neck; a plurality of first mirrors are disposed opposing to the plurality of openings of the first light source units in an inside of the first light guide; the first mirrors reflect light emitted from the plurality of the first light source units to the first direction; a plurality of second mirrors are disposed opposing to the plurality of openings of the second light source units in an inside of the first light guide; the second mirrors reflect light emitted from the plurality of the second light source units to the first direction; and the first mirrors and the second mirrors do not overlap when viewed from the first direction.

DETAILED DESCRIPTION OF THE PREFERRED EMBODIMENTS

Figure 1:
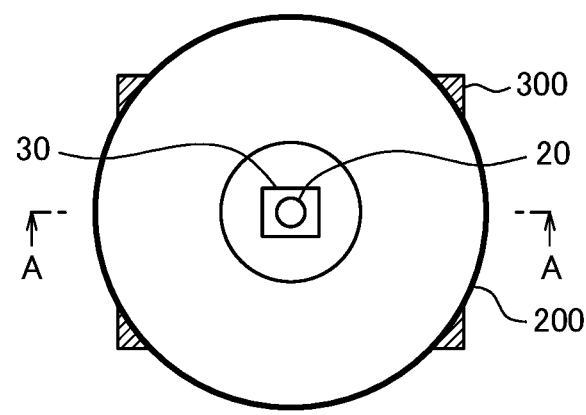
FIG. 1 is a plan view of the lighting device in which a parabolic mirror is used to project collimated light.
Figure 2:
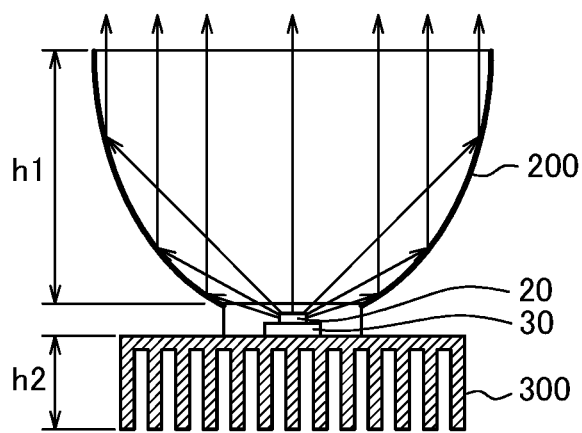
FIG. 2 is a cross sectional view of FIG. 1 along the line A-A.

FIG. 1 is a plan view of a lighting device using a parabolic mirror 200; FIG. 2 is a cross sectional view of the lighting device. In FIG. 1, an LED 20 is located at the center of the parabolic mirror 200. The LED 20 is, for example, disposed on the PCB substrate 30 for the LED. The LED 20 is a high bright LED which becomes high temperature; therefore, the LED is disposed on the heat sink 300. In FIG. 1, a part of the heat sink 300, which is located at the back of the parabolic mirror 200, is visible.

FIG. 2 is a cross sectional view of FIG. 1 along the line A-A. In FIG. 2, the LED is located at the bottom of the parabolic mirror 200. The light emitted from the LED 20, (except the one which goes straight up) reflects at the parabolic mirror 200 and becomes the light parallel to the light axis. However, an enough height for h1 of the parabolic mirror 200 is necessary to make it work thoroughly. The height of the parabolic mirror h1 needs to be approximately 60 mm to acquire a light distribution angle of 12 degrees. Actually, a height h2 of the heat sink is added, therefore, a total thickness of the lighting device becomes 80 mm or more. Therefore, it is difficult to realize a thin lighting device by the structure of FIGS. 1 and 2.

Figure 3:
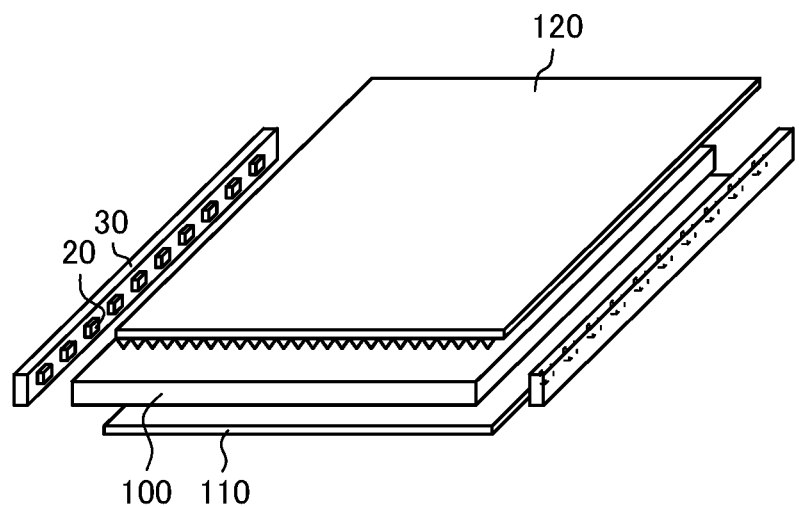
FIG. 3 is an exploded perspective view of a lighting device, which has a light guide.

FIG. 3 is a perspective view of an example of the lighting device, in which a thickness can be made very thin. In FIG. 3, the LEDs 20 are aligned with a uniform interval on the two side surfaces of the light guide 100. A reflecting sheet 110 is disposed at the bottom of the light guide 100. The reflecting sheet 110 reflects the light, which goes downward, to upward, namely toward the emitting surface side.

In FIG. 3, the light guide 100 is disposed on the reflecting sheet 110. A thickness of the light guide 100 is approximately 2 mm. The light guide 100 has a role to direct the light from the LED 20 incident from the side surface of the light guide 100 to upward direction toward the light emitting surface. The light, which goes downward in the light guide 100 is reflected by the reflecting sheet 110 to upward direction toward the light emitting surface.

Prism arrays are formed on the upper surface and the bottom surface of the light guide 100 so that the light entered the side surface of the light guide 100 is efficiently emitted from the major surface of the light guide 100 to form a surface light source. The prism sheet 120 is disposed on the light guide 100. In FIG. 3, the prism sheet 120 is a so-called reverse prism sheet 120, in which a prism array is formed on the bottom surface of the prism sheet 120.

Figure 4:
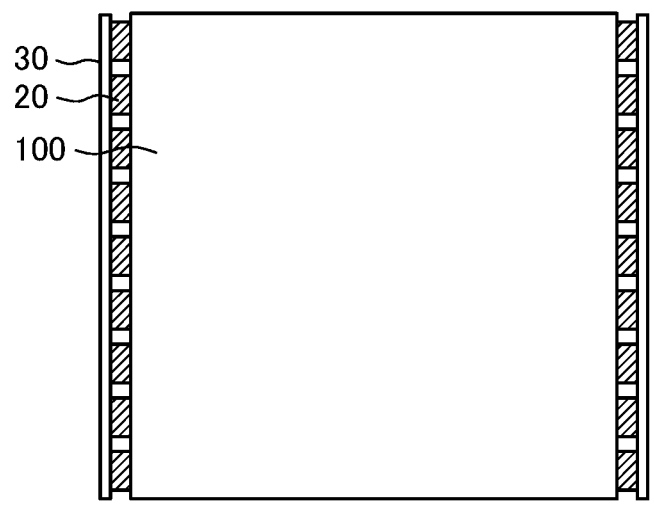
FIG. 4 is a plan view of a lighting device, which has a light guide, corresponding to FIG. 3.
Figure 5:
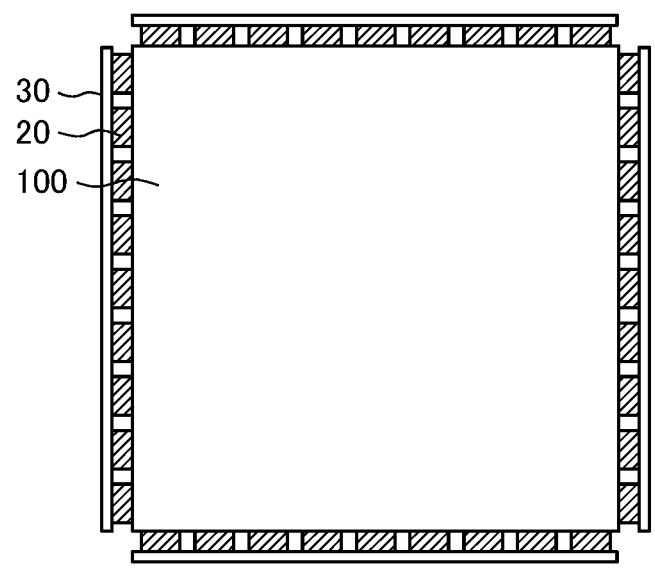
FIG. 5 is a plan view of a lighting device, which has a light guide, according to another example.

FIG. 4 is a plan view which shows the LEDs 20 being disposed on the opposing two side surfaces of the light guide 100. A plurality of LEDs 20 are disposed on the LED substrate 30. The light from the LEDs 20 enters the side surfaces of the light guide 100, and emitted from the top surface of the light guide 100, namely upward of the sheet. The LEDs 20 are disposed in proximity to the side surface of the light guide 100 so that a light utilizing efficiency is increased. FIG. 5 is a plan view which shows the LEDs 20 are disposed on the four side surfaces of the light guide 100 to increase the light amount emitted from the major surface of the light guide 100.

The lighting devices shown FIGS. 3 to 5 can decrease a thickness of the lighting device, however, the light from the LED 20 is not collimated; therefore, a loss of light by reflection and scattering between the opposing surfaces of LED 20 and the light guide 100, between the light guide 100 and the reflection sheet 110, between the light guide 100 and prism sheet 120, and so forth. Therefore, those structures have a problem that light utilizing efficiency is not good.

The purpose of the present invention is to realize a lighting device of thin, having high light utilizing efficiency, and being able to emit thoroughly collimated light. The present invention is explained in detail by utilizing following embodiments.

Embodiment 1

Figure 6:
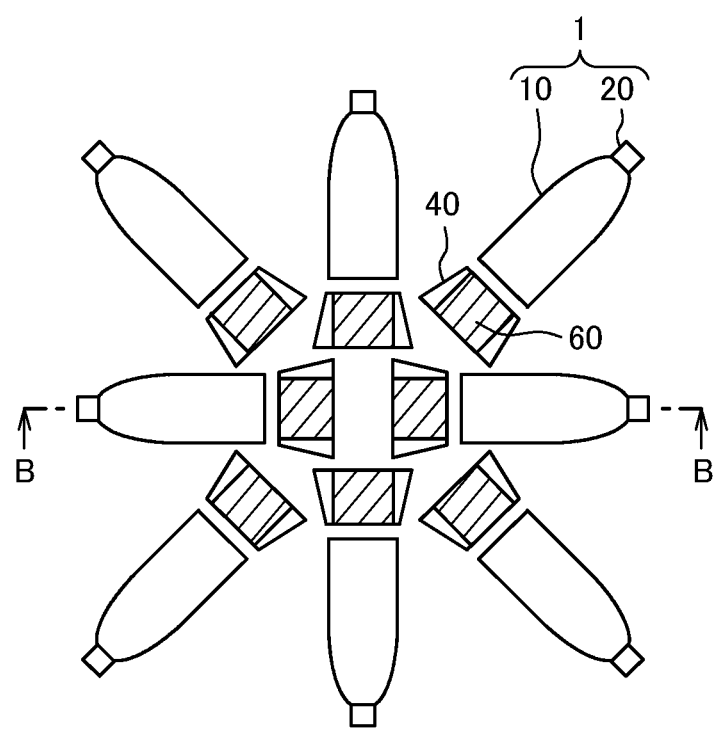
FIG. 6 is a plan view of embodiment 1.

FIG. 6 is a plan view of the structure of embodiment 1 of the present invention. In FIG. 6, eight light source units 1, each has a LED light source 20 and a funnel shaped reflector 10, are located in a plane with 45 degrees interval in azimuth. A mirror 40 is disposed at exit of each of the funnel shaped reflectors 10 to direct the light from the funnel shaped reflector 10 to upper normal direction of the sheet. In FIG. 6, 60 is a cross sectional view of the light flux, and a shape of the mirror 40 is trapezoidal. As depicted in FIG. 6, the cross sectional view of the light flux 60 is rectangle. In the meantime, the surface of the mirror 40 can be trapezoidal or rectangle. In FIG. 6, the major surface of the mirror 40 tilts 45 degrees with respect to the light axis of the emitting light from the funnel shaped reflector 10, therefore, the light flux 60 goes in normal direction of the sheet after being reflected at the mirror 40.

Figure 7:
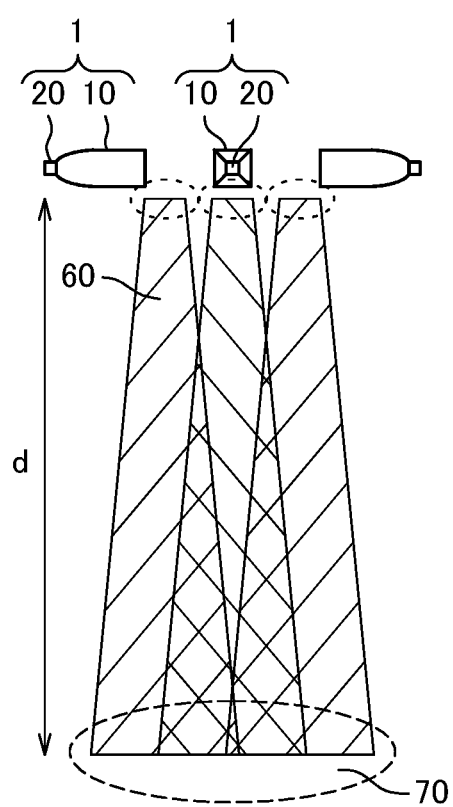
FIG. 7 is a cross sectional view which shows a function of embodiment 1.

FIG. 7 is a cross sectional view corresponding to the line B-B of FIG. 6. FIG. 7 shows the lighting device according to embodiment 1, and shows a relation between the lighting device of embodiment 1, the light flux 60 emitted from the lighting device of embodiment 1, and the light spot 70 at e.g. the floor. By the way, since FIG. 6 is a bottom view, the light from the light source 1 unit 1 goes downward in FIG. 7.

The arrangement of the light source units 1 in the lighting device according to embodiment 1 is shown in FIG. 7. Three light source units 1 are shown and other light source units 1 are omitted in FIG. 7. The mirror 40 is omitted from FIG. 7 to avoid complication of the drawing. In FIG. 7, the light from the light source unit 1 is reflected at the mirror 40, which is not shown in the figure, and goes downward to the irradiated surface. FIG. 7 shows that the light from three light source units 1 irradiates the irradiated surface to form a light spot 70.

A distance d from the lighting device to the irradiated surface is e.g. 2 to 4 meters. In FIG. 7, light from each of the three light source units 1 is thoroughly mixed on the way of light passes of 2 to 4 meters to the irradiated surface, thus the light from the three light source units 1 is visible as one light spot. More concretely, mirrors 40 can be disposed in a radius of 30 mm from the center of the light device; therefore, light reflected each of mirrors 40 is thoroughly mixed on the way of light passes of 2 to 4 meters to the irradiated surface.

Figure 8:
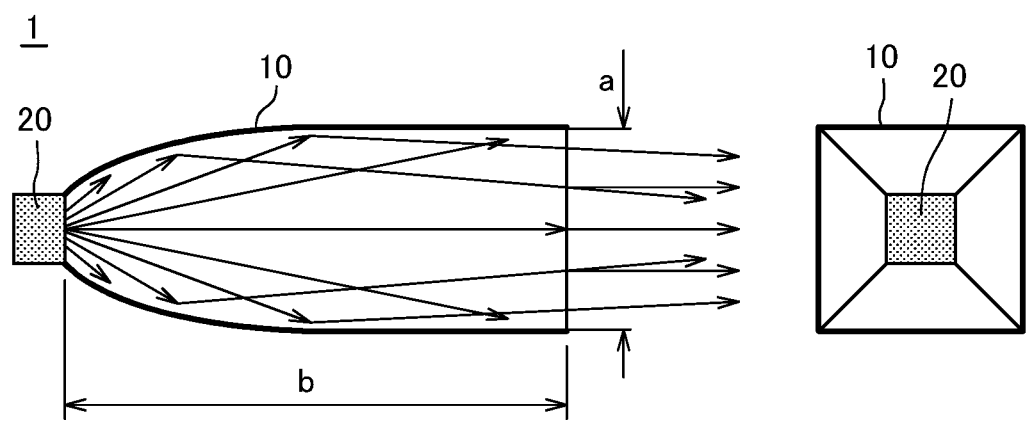
FIG. 8 is a cross sectional view of the light source reflector along the optical axis, and a cross sectional view of the light source reflector in a plane perpendicular to the optical axis, to show a shape of the light source reflector.

FIG. 8 is a cross sectional view to show the structure of light source unit 1. Left hand side of FIG. 8 is a cross sectional view of the light source unit 1 along the direction parallel to the optical axis; right hand side of FIG. 8 is a cross sectional view of the light source unit 1 along the direction perpendicular to the optical axis. As shown in the right hand side of FIG. 8, a cross sectional view of the funnel shaped reflector 10 is rectangular at the opening; that is to say, a cross sectional view of the light flux emitted from the light source unit 1 is rectangular.

In FIG. 8, the thick lines show a cross sectional view of the container. The funnel shaped reflector 10 can be formed from e.g. metal plate of high reflectivity. Alternatively, the funnel shaped reflector 10 can be formed as that the funnel portion is formed by resin, and a metal of high reflectivity as e.g. aluminum or silver is deposited by vacuum evaporation on the inner surface of the funnel.

As shown at left hand side of FIG. 8, the light source unit 1 is constituted from the LED light source 20 and the funnel shaped reflector 10. On a cross sectional view of the funnel shaped reflector 10 in a direction of optical axis, at least a part of an inner surface of the funnel shaped reflector 10 has a parabolic mirror so that the light from the LED light source 20 is reflected to a direction parallel to the optical axis. In FIG. 8, the inner diameter a of the funnel shaped reflector 10 is e.g. 6.5 mm, and the length b is e.g. 30 mm. In a case when the funnel shaped reflector 10 is formed by metal, necessary mechanical strength can be maintained by a thickness of 0.2 mm, thus, the outer diameter of the funnel shaped reflector 10 can be made 7 mm or less. As the same token, the outer surface of the funnel shaped reflector 10 can be made small when it is made from resin and its inner surface is coated by reflecting film of metal formed by vacuum evaporation or sputtering.

The LED light source 20 is set at the side (neck side) of the funnel shaped reflector 10 opposing to the opening of to the funnel shaped reflector 10. The outer shape of the LED light source 20 is e.g. a rectangular, each of the sides is 1.3 mm. Therefore, the outer sizes of the funnel shaped reflector 10 and the LED light source 20 are both very small.

Since the funnel shaped reflectors 10 are disposed in laid down state as depicted in FIGS. 6 and 7, the lighting device can be made very thin. By the way, according to the ratio, b/a between the diameter a of the opening and the length b of the funnel shaped reflector 10, becomes larger, the light can be more collimated. In the lighting device of the present invention, the thickness of the lighting device is not changed even when the length b of the funnel shaped reflector 10 is made longer, thus, a thoroughly collimated light can be acquired in the present invention.

Figure 9:
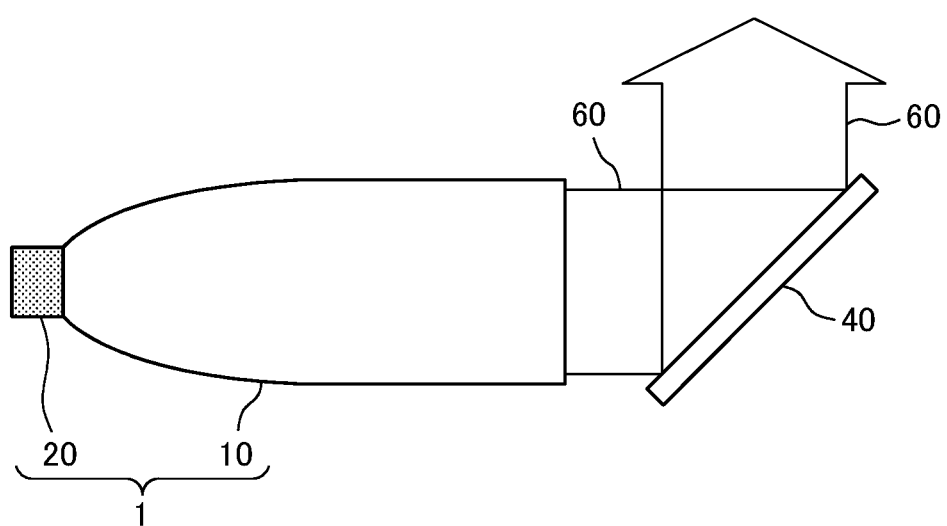
FIG. 9 is a cross sectional view to show a function of the light source unit and the mirror.

FIG. 9 is a cross sectional view of the light source unit 1, in which the funnel shaped reflector 10 and the LED light source 20 are included, and the mirror 40 is assembled. In FIG. 9, the light from the LED light source 20 is collimated by the funnel shaped reflector 10 and is emitted from the opening of the funnel shaped reflector 10. The light is changed in its direction by 90 degrees by the mirror 40 and goes upper direction. The direction of the light in FIG. 9 is upward, which is reversed direction of the reflected light in FIG. 7; however, this is only a matter of the angle of the mirror 40, but the principle is the same.

Figure 10:
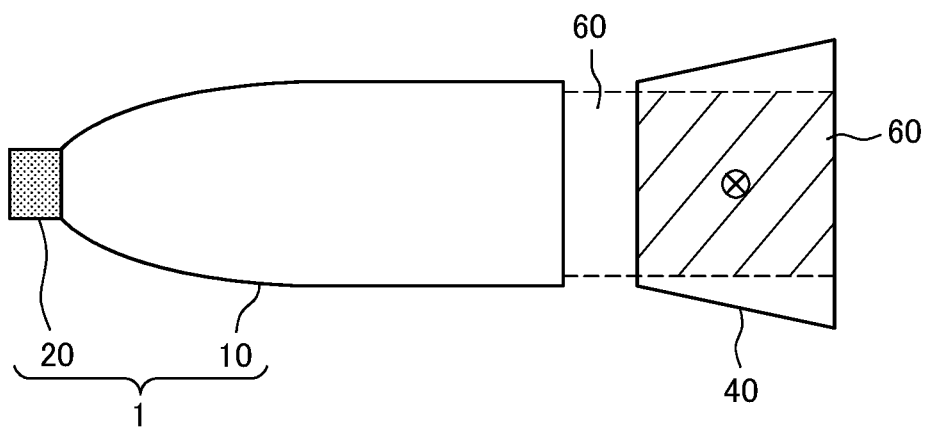
FIG. 10 is a plan view to show a function of the light source unit and the mirror.

FIG. 10 is a plan view of the light source unit 1, in which the funnel shaped reflector 10 and the LED light source 20 are included, and the mirror 40 are assembled corresponding to FIG. 9. In FIG. 10, the plane shape of the mirror 40 is trapezoidal: however, it is not limited to trapezoidal, but it can be e.g. rectangle. The light flux 60 emitted from the funnel shaped reflector 10 is reflected upward by the mirror 40 at the shaded area. When a direction of the reflected light flux 60 is desired downward, the angle of the mirror 40 can be changed.

In FIG. 6, eight assemblies of the light source unit 1 and the mirror 40, explained in FIGS. 8 through 10, are disposed. The feature of FIG. 6 is that the already collimated light by the light source unit 1 irradiates the mirror. Therefore, the size of the mirror is made smaller, and the small light spot can be realized; in addition, a thin lighting device can be realized. Further, it is easy to form any shape of the light spot since the light source unit 1 and the mirror 40 can be made smaller.

In FIG. 6, distances between the center of the lighting device and the assemblies of the light source unit 1 and the mirror 40 are not the same. That configuration enables to dispose a plurality of light unit 1 in small area, thus, a light spot 70 can be made smaller. In addition, a dead space near the center of the lighting device can be decreased and, thus, the lighting device can be made smaller by that configuration. Another merit of the structure of FIG. 6 is that a diameter of light spot or intensity distribution of the illuminance of light spot can be controlled by adjusting a distance between the center of the lighting device and each of the plurality of the assemblies of the light source unit 1 and the mirror 40.

An example for an efficient assembly for the configuration of FIG. 6 is e.g. to form a resin mold for the assembly, and to insert the light source unit 1 and the mirror 40 in the mold. A thickness of the lighting device as a total can be made very thin in configuration of FIG. 6 because a diameter of the funnel shaped reflector 10 in a direction perpendicular to the optical axis is 7 mm or less. On the other hand, the illuminance of the light spot is a summation of eight light sources 1, thus, high luminance can be realized. In addition, a plurality of the LED light sources 20 are disposed with a certain distance to each other, thus, a problem of heat generation in LED light sources 20 can be mitigated.

In the meantime, eight light source units 1 are used in FIG. 6 as an example, however, any numbers of the light source units 1 can be used according to a necessity of a shape of light spot or a size of the lighting device and so forth.

Embodiment 2

Figure 11:
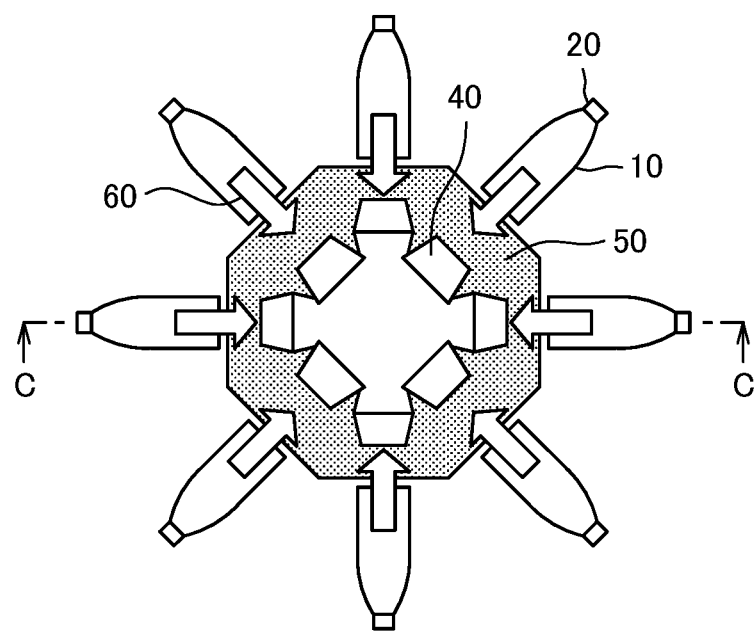
FIG. 11 is a plan view of embodiment 2.
Figure 12:
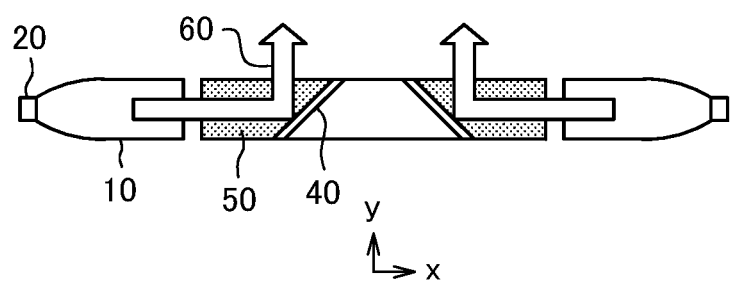
FIG. 12 is a cross sectional view of embodiment 2.

FIG. 11 is a plan view of the lighting device according to embodiment 2; FIG. 12 is a cross sectional view of FIG. 11 along the line C-C. Embodiment 2 differs from embodiment 1 in that the light guide 50, which include mirrors 40, is used and a plurality of light source units 1 are disposed around the light guide 50. In FIG. 11, since the mirror 40 is already installed in the light guide 50, an alignment accuracy as the lighting device can be improved because only alignment between the light guide 50 and the light source units 1 is necessary in the assembly process.

In FIG. 11, the light guide 50 is ring shaped in which inner side is hollowed out. The outer shape of the light guide 50 is octagon; corresponding to sides of octagon, the mirrors 40 are disposed inside of the light guide 50. The light guide 50 is made from transparent resin as e.g. acrylic resin or poly-carbonate resin. In a plan view, distances between the center of the lighting device and the plurality of mirrors 40 are different. The reason is the same as explained in embodiment 1.

In FIG. 11, the light source unit 1 is disposed at each outer side of octagon of light guide 50. The configuration of each of the light source unit 1 is the same as explained in FIG. 8. That is to say, the light, emitted from each of light source unit 1, is a collimated light; thus, the light enters the light guide efficiently. The light incident in the light guide 50 goes straight toward the mirror 40; the direction of the light is changed in 90 degrees at the mirror 40.

FIG. 12, which is a cross sectional view of FIG. 11 along the line C-C, shows this function. The arrow in FIG. 12 is a light pass of the light emitting from light source unit 1. In FIG. 12, a thickness of the light guide 50 in y direction is approximately the same as a thickness of the funnel shaped reflector 20 in y direction. Mirror 40 is disposed on the inner wall of the light guide 50 with an angle of 45 degrees with respect to x axis. The mirror 40 in FIG. 12 can be formed by adhering the metal film having high reflectivity to the inner wall of the light guide 50. Alternatively, the mirror 40 in FIG. 12 can be formed by depositing a metal film of high reflectivity through sputtering or vacuum evaporation and the like.

In FIG. 11, the outer shape of the light guide 50 is a regular octagon; however, a deformed octagon can be used according to a necessity of e.g. distances between the mirrors 40 and the light source units are made to be the same, and so forth. In FIG. 11, distances between the center of the lighting device and the mirrors 40 are different to decease a dead space in the light guide 50; however, if a planar size of the lighting device is allowable, the inner wall can be a regular octagon as the outer wall of the light guide 50.

In the meantime, eight light source units 1 are used in FIG. 11 as an example, however, any numbers of the light source units 1 can be used according to a necessity of a shape of light spot or a size of the lighting device and so forth. In addition, the plan view of the light guide 50 can be made triangular or any polygon; and the shape of inner opening of the light guide 50 can be changed according to the outer shape of the light guide 50.

Embodiment 3

Figure 13:
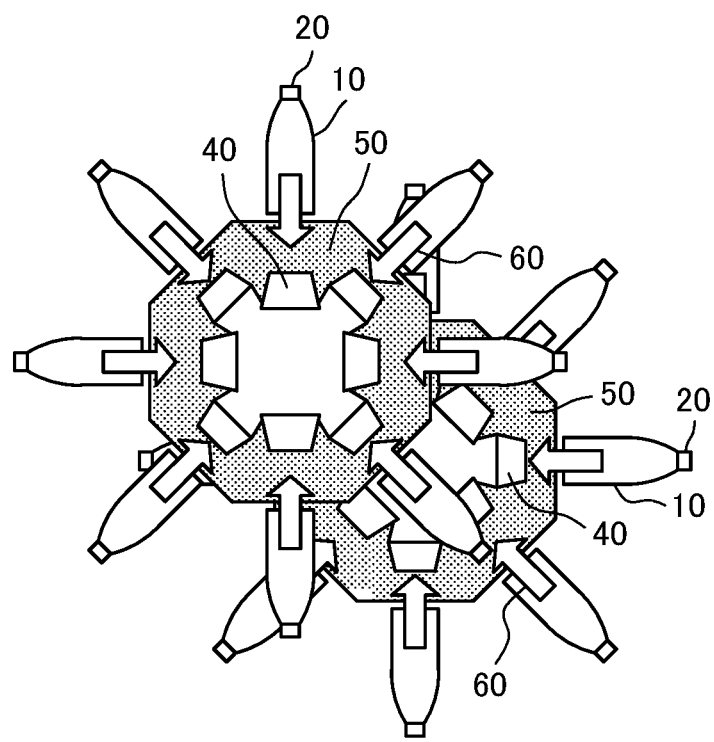
FIG. 13 is a plan view of embodiment 3.
Figure 14:
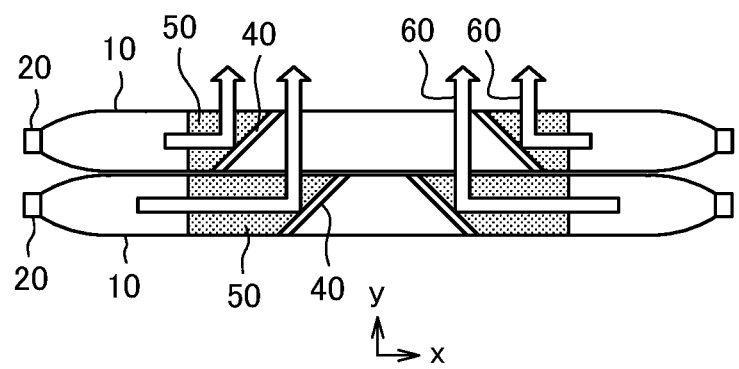
FIG. 14 is a cross sectional view of embodiment 3.

FIG. 13 is an exploded perspective view of the lighting device according to embodiment 3; FIG. 14 is a cross sectional view of FIG. 13. The feature of FIG. 13 is that lighting devices each having a light guide 50 as explained in embodiment 2 are superposed one on top of another. That is to say, a light intensity can be made double in the structure of FIG. 13 compared with the structure of embodiment 2. On the other hand, a size of the light spot can be made approximately the same as in embodiment 2. In the meantime, the function of the top lighting device and the bottom lighting device is the same as explained in embodiment 2.

In FIG. 13, the first lighting device of bottom side and the second lighting device of top side have the same shape. The first light guide and the second light guide are different in positions of the mirrors 40 in the light guide 50. As shown in FIG. 14, the structure has a relation that the light from the first lighting device located at bottom side is not shaded by mirrors 40 of the second lighting device located at top side. In other words, the configuration takes that the mirrors 40 in the first lighting device and the mirrors 40 in the second lighting device do not overlap each other.

In FIG. 13, the sides of the light guide 50 (herein after first light guide) in the first lighting device and the sides of the light guide 50 (herein after second light guide) in the second lighting device overlap each other. A difference between the first lighting device and the second lighting device is that a length between the center of the lighting device and the mirror 40 disposed in the light guide 50 is changed in 45 degrees in azimuth from each other. Therefore, the structure of FIG. 13 can be formed by providing identical two lighting sources; and the two identical lighting sources are assembled with an azimuth angle of 45 degrees to each other.

The light guide in FIG. 13 and FIG. 14 is octagon, however, the shape of the light guide is not limited in octagon, but the light guide 50 can be triangle or any polygon. Specifically, if the light guide is polygon of even sides as rectangle, hexagon, and so forth, the same light guide 50 can be used for both the first lighting device and the second lighting device with only rotating in azimuth when assembling the first lighting device and the second lighting device, as explained in FIG. 13.

The structures of FIGS. 13 and 14 are examples in which the light guide 50 is used in the first lighting device and the second lighting device. However, the first lighting device and the second lighting device, which do not use the light guide 50 as embodiment 1, can also be used in superposition. In that case, functionally, the structure is arranged as that the mirror 40 in the first lighting device and the mirror 40 of the second lighting device are not superposed one on top of another in a plan view.

Concretely, the structure for each of the first lighting device and the second lighting device is provided by setting the light source unit 1 and the mirror 40 in a transparent resin mold; and the first lighting device and the second lighting device are superposed one on top of another, keeping in mind as that the mirror 40 of the first lighting device and the mirror 40 of the second lighting device are not superposed one on top of another in a plan view. Such structure differs functionally from the structure of FIGS. 13 and 14 only in that such structure does not have a light guide 50 between the light source unit 1 and the mirror 40.

Such mold can be made polygon and the light source unit can be disposed at each side of the polygon; in that case, if the polygon of even sides is chosen, the two same lighting devices can be used with only rotating in azimuth when assembling the first lighting device and the second lighting device.

In the structure explained above, the minimum light spot can be attained when the mirror 40 is tilted in 45 degrees with respect to the optical axis. However, the tilting angle of the mirror can be deviated with certain amount from 45 degrees from the optical axis according to a necessity of a shape of light spot.

What is claimed is:

1. A lighting device comprising a light guide, which emits light in a direction perpendicular to a major surface, wherein a plurality of light source units, each of which has an optical axis in a direction parallel to the major surface, are disposed radially with a certain azimuth with respect to a center of the light guide at an outside of the light guide, each of the plurality of the light source units includes a funnel shaped reflector, which has an opening and a neck, and an LED light source disposed at the neck, a plurality of mirrors are disposed opposing to the plurality of openings of the light source units in an inside of the light guide, and the mirrors reflect light emitted from the plurality of the light source units to the direction perpendicular to the major surface.

2. The lighting device according to claim 1, wherein the light guide is ring shaped, and the plurality of mirrors are disposed at an inner wall of the light guide.

3. The lighting device according to claim 1, wherein an inner wall of the funnel shaped reflector is mirror surface, and at least a part of a cross section of the inner wall along the light axis is parabolic.

4. The lighting device according to claim 1, wherein a cross section of the opening of the funnel shaped reflector in a direction perpendicular to the light axis is rectangular.

5. The lighting device according to claim 1, wherein distances between the center of the lighting device and the openings of the plurality of funnel shaped light source reflectors are different.

6. The lighting device according to claim 1, wherein distances between the center of the lighting device and centers of the plurality of mirrors are different.

7. A lighting device comprising a first light guide having a first major surface, and a second light guide having a second major surface, wherein the first light guide and the second light guide are superposed one on top of another, the first light guide emits light in a first direction, which is perpendicular to the first major surface, the second light guide emits light in the first direction, which is perpendicular to the second major surface, a plurality of first light source units, each of which has an optical axis in a direction parallel to the first major surface, are disposed at an outside of the first light guide and disposed radially with a certain azimuth with respect to a center of the first light guide, a plurality of second light source units, each of which has an optical axis in a direction parallel to the second major surface, are disposed at an outside of the second light guide and disposed radially with the certain azimuth with respect to a center of the second light guide, each of the plurality of the first light source units and the second plurality of the light source units includes a funnel shaped reflector, which has an opening and a neck, and an LED light source disposed at the neck, a plurality of first mirrors are disposed opposing to the plurality of openings of the first light source units in an inside of the first light guide, the first mirrors reflect light emitted from the plurality of the first light source units to the first direction, a plurality of second mirrors are disposed opposing to the plurality of openings of the second light source units in an inside of the first light guide, the second mirrors reflect light emitted from the plurality of the second light source units to the first direction, and the first mirrors and the second mirrors do not overlap when viewed from the first direction.

8. The lighting device according to claim 7, wherein the first light guide is ring shaped, and the plurality of first mirrors are disposed at an inner wall of the first light guide, and the second light guide is ring shaped, and the plurality of second mirrors are disposed at an inner wall of the second light guide.

9. The lighting device according to claim 7, wherein the first light guide and the second light guide are same shaped, the second light guide is rotated with a certain degree of azimuth with respect to the first light guide.

* * * * *